March 29, 1927.
F. J. BARNES
1,622,899
CONSTRUCTION OF MOTOR ROAD VEHICLE BODIES
Filed March 11, 1926
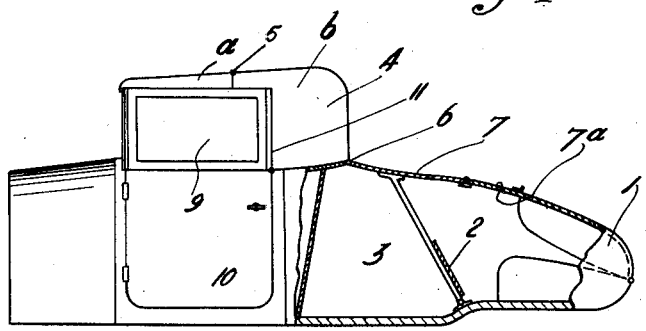
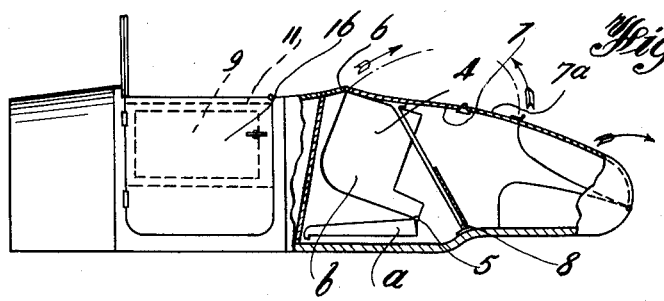
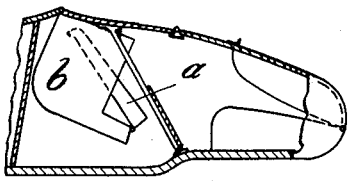
Inventor
Frederick J. Barnes,
by Bright & Bailey
Attys Patented Mar. 29, 1927.

1,622,899

UNITED STATES PATENT OFFICE.

FREDERICK JAMES BARNES, OF STOURBRIDGE, ENGLAND.

CONSTRUCTION OF MOTOR-ROAD-VEHICLE BODIES.

Application filed March 11, 1926, Serial No. 94,006, and in Great Britain April 29, 1925.

This invention relates to improvements in the construction of motor road vehicle bodies of the type employing a hood having a substantially horizontal roof portion, and a back portion which can be accommodated inside the vehicle body so as to be invisible when not required for use, but can be pulled out to form a hood which can be erected so as to engage the usual windscreen so as to present the appearance of an ordinary hood.

The object of my invention is to provide a novel and compact method of folding the hood and to generally improve the appearance of a motor vehicle.

In a motor road vehicle according to my invention the hood comprises roof and back portions hingedly connected together, the rear of the hood being hingedly connected at its rear edge to the body of the vehicle so that it can be swung with the roof portion into a compartment behind the seat whereby the hood can be wholly concealed and located behind the seat. By this form of hood the hood when folded away is turned practically upside down.

Preferably the side doors of the vehicle body accommodate after known principle vertically slidable side windows adapted to fill in the spaces between the sides of the hood and the vehicle body so that the front seat is totally enclosed.

In order that my invention may be clearly understood and readily carried into effect, I have appended hereto a sheet of drawings illustrating same as applied to a "two seater."

Fig. 1 is a side elevation with parts in section, the top being shown in raised position.

Fig. 2 is an elevation with parts in section, the top being shown in lowered position.

Fig. 3 is a detail view of a slight modification.

Referring to the drawings a body of a two seater motor road vehicle is shown. The rear part of the body is adapted to have a dicky seat at the part 1, but if desired a dicky seat, need not be provided. In the construction shown a footboard or partition 2 separates the dicky seat compartment from the rear of the front seat to provide protection for the dicky seat passengers and to protect the hood when folded away. The hood 4 comprises two parts $a$ and $b$ roof and back respectively although it may be divided into more parts, and these parts are maintained at all times in the shape required for use. They are hingedly or detachably connected together as at 5, so that the roof portion $a$ can be folded on or into the back portion $b$. The roof portion is hingedly supported as at 6 to the body and is adapted to be swung about such pivot into the compartment 3 as shown in Fig. 2, arcuate guides in the side walls of the compartment 3 if desired being provided, such guides being in the form of arcuate channel section metal members having a radius struck from the pivot 6 and adapted to receive suitable runners on the rear of the hood. However other suitable guides may be provided.

Springs or counter-balance weights operating in any suitable known manner can be provided to assist in lifting the hood from the compartment 3.

To avoid as much waste of space as possible the footboard 2 is preferably hingedly supported at 8 at its base so that it can move rearwards to enable the hood when folded to clear it, a spring or other suitable catch being provided to hold the footboard 2 in the normal position shown in the drawings.

An opening is formed in the top of the body through which the hood moves to and from raised and lowered positions, this opening being closed normally by a door 7 hinged to the body and suitably connected with the footboard 2, so that when said door is opened the footboard is swung rearwardly about its hinge connection 8 with the body out of the path of swinging movement of the hood. If desired the part 7 may be hingedly or fixedly secured to the top of the footboard also a lid $7^a$ can be hingedly connected to the part 7 to provide easy access to the interior of the rear of the body when it is used as a luggage compartment.

To close in the sides of the hood a vertically sliding window 9 is provided in each door 10 the edge of the windscreen serving as a guide for the front edges of the windows, and a pair of uprights 11 serving as guides for the rear edges of the windows, such uprights being pivotally supported at their base so that they can be folded into the top of the doors when not required for use as shown in Fig. 2. Alternatively the uprights or guides 11 may form part of the front edges of the back part of the hood and move with it.

When the roof portion $a$ of the hood is sufficiently narrower than the back portion to enable the front of the roof portion to be folded into the back portion this may be effected as shown in Fig. 3 by placing the hinges connecting the two parts so that the front portion can swing downwards instead of upwards from extended position.

The compartment 3 may be shaped to correspond with the outline of the folded hood to prevent it shaking about when folded into the compartment, or suitable straps or brackets may be provided to hold the hood in folded position stationary inside the compartment 3.

What I claim is:—

In combination, a vehicle body, a hood hinged thereto for swinging movement between raised and lowered positions, said body having an opening in the top thereof through which said hood moves to and from raised and lowered positions, a door for said opening, a dicky seat to the rear of said opening, a foot board in advance of said dicky seat, and a connection between said footboard and said door whereby the footboard is moved out of the path of swinging movement of the hood when the door is opened.

FREDERICK JAMES BARNES.